United States Patent Office 2,895,786
Patented July 21, 1959

2,895,786

PROCESS FOR MAKING FILAMENTS FROM POLYVINYL ALCOHOL POLYAMIDE MIXTURE AND PRODUCT

Paul Schlack, Leitershofen, near Augsburg, Germany, assignor to Bobingen Aktiengesellschaft für Textil-Faser, Bobingen, Bobingen, Germany, a company of Germany No Drawing. Application September 1, 1953
Serial No. 377,964

Claims priority, application Germany September 4, 1952

11 Claims. (Cl. 18—54)

This invention relates to the manufacture of fibers and other structures based on polyvinyl alcohol.

By spinning polyvinyl alcohol from aqueous solutions into precipitating baths with subsequent hardening by means of carbonyl compounds, especially by means of formaldehyde, for instance according to the process of the German specification No. 765,265, there are obtained threads possessing a particularly high tensile strength. The resistance to hot aqueous liquids is, however, as a rule insufficient and the shrinkage occurring on boiling leads to an undesirable marked increase of the elongation at break. Besides, the threads agglutinate easily, especially if the treatment liquids have a strong alkaline reaction. It is also known that water-insoluble threads of polyvinyl alcohol can be obtained by spinning aqueous solutions thereof, containing soluble and hardenable urea-formaldehyde resins, into aqueous precipitating baths and subjecting the threads to a heat treatment, preferably in the presence of acid. However, threads which are satisfactory from an industrial point of view, have not been obtained according to this process.

Now I have found that very valuable fibers and threads based on polyvinyl alcohol, which materials are suitable for textiles for daily use, and also water-resistant bands and films with favorable physical, chemical and tinctorial properties, can be obtained when aqueous solutions of polyvinyl alcohol or of derivatives thereof soluble in water or in preponderantly aqueous liquids, which solutions likewise contain mainly linear polymers with reactive hydrogen at an amide nitrogen, said polymers likewise being soluble in water or in preponderantly aqueous solvents, are extruded by means of the usual technical equipment or are spun into aqueous, preferably salt-containing, precipitating baths; the structures formed being then treated, at an elevated temperature, with reactive carbonyl compounds, especially with aldehydes or substances splitting off aldehydes in the presence of acids or acid-forming substances. According to the process of the present invention there are obtained threads which are cross-linked to such an extent that, after a shrinkage treatment, they are practically completely fast to boiling without becoming brittle. A particular advantage of the process resides in the fact that threads with functional salt-forming groups, such as amino and/or carboxyl groups, can easily be produced which can then be dyed by basic and/or acid dyestuffs, in contradistinction to the simple threads of polyvinyl alcohol which show a comparatively limited affinity for dyestuffs. The absorption of moisture at a given degree of acetalization can also be adjusted within certain limits by the incorporation of certain salt-forming groups. A further important advantage of the process resides in the fact that, by the presence of the linear polyamide compounds capable of forming hydrogen linkages, the threads are hardened more rapidly and brought into a form showing a lower degree of swelling than threads of polyvinyl alcohol only. Besides, the reaction with carbonyl compounds is effected more rapidly and under certain circumstances so rapidly that the process can wholly or at least preponderantly be carried out in a continuous manner.

For the process according to the invention there are best used polyvinyl alcohols which are practically free from acyl groups, for instance such as contain only about 1–3 percent of residual acetyl. However, derivatives are also suitable the hydroxyl groups of which are substituted to such an extent or contain such substituents that, at the correct pH value, the solubility in water or in preponderantly aqueous liquids, for instance in very dilute methanol or in aqueous solutions of acetone, tetrahydrofurane or dioxane, is maintained. Beside the partially hydrolysed products, there belong to this group also partial acetals with, for instance, formaldehyde, butyraldehyde or other reactive carbonyl compounds, such as methoxyacetaldehyde, alkali-soluble acetals with glyoxylic acid or with aromatic hydroxy aldehydes and finally acid-soluble acetals with aminocarbonyl compounds such as dimethylamino-acetaldehyde, morpholino-acetone or meta-dimethylamino-benzaldehyde. Water-soluble, hydrolized copolymers of vinyl acetate and vinyl chloride, acrylic acid, acrylic acid amide, methacrylic acid amide, fumaric acid mono-amide, itaconic acid diamide and other vinyl polymers may also be used. Amongst these compounds, the polyvinyl alcohols with amide groups, as are obtained, for instance, by hydrolysis or re-esterification of copolymers of the four last named types, occupy a special position which will later be referred to. The synthetic, linear, nitrogen-containing compounds of high molecular weight which, for use according to the present invention, must at least partially carry reactive hydrogen at the amide nitrogen, can be divided into two main classes:

(a) Vinyl polymers containing amide groups in side chains.

(b) Condensation polymers of a chiefly linear constitution, soluble in water or in preponderantly aqueous liquids, such as very dilute methanol, or only soluble with formation of salts with the aid of acid or basic groups, said polymers containing, in the chain and/or in lateral substituents, amide groups with reactive hydrogen at the amide nitrogen.

Synthetic, linear, nitrogen-containing compounds of high molecular weight containing primary amide groups are particularly reactive for the purpose of the invention. However, synthetic, linear, nitrogen-containing compounds of high molecular weight containing only secondary amide groups, especially if these are in the chain, as in the case of the linear polyamides, polyureas and polyurethanes, can be reacted very well and often with quite particular advantage, according to the invention.

The following compounds, for example, belong to group (a): polyacrylamide, polymethacrylamide, poly-methacrylic acid methylamide, poly-α-chloracrylamide, copolymers of acrylic acid amide or methacrylic acid amide with methacrylic acid, acrylic acid methyl ester, acrylic acid dimethylamide, polyacrylonitrile partially hydrolyzed, for instance with 60 percent of the theoretically necessary quantity of caustic soda or with ammonia under pressure, to form a water-soluble salt, basic copolymers of acrylic acid amide and basic esters such as acrylic acid-γ-dimethylaminopropyl ester, furthermore quaternated derivatives of such basic copolymers, for instance reaction products with dimethyl sulfate, with ethylene chlorhydrin or with sodium chloracetate, and finally copolymers amidated by means of ammonia or primary amines and made water-soluble or transformed into water-soluble salts, said copolymers being obtained from anhydrides of unsaturated α:β-dicarboxylic acids, such as maleic acid anhydride or itaconic acid anhydride, and other vinyl monomers such as acrylic acid methylamide, vinylmethyl ether, vinyl acetate and styrene. Basically substituted copolymers of this kind are also well suited and particularly valuable, for instance the reaction products of copolymers of maleic acid anhydride with primary-secondary and primary-tertiary diamines such as assym.-dimethylethylene diamine. Provided that they are soluble in water or in aqueous liquids containing a high proportion of water, such as dilute methanol, the analogous reaction products of ammonia or amines with copolymers in which maleic acid anhydride is replaced by an amide such as maleic acid methylimide may equally well be used, as, for instance, the copolymer amidated with γ-dimethylamino-propylamine and obtained from 1 mol of maleic acid-N-methylimide and 1 mol of vinylmethyl ether. The above enumeration of suitable materials is by no means exhaustive, but is only given for illustration of the many and varied possibilities and also to show in how many ways functional groups of acid or basic character which possess effective tinctorial and finishing properties can play a useful part in the process of the present invention.

To the second, likewise very extensive group (b) of the additives for use according to the invention, which, as in the case of the first group, comprises substances which are only water-soluble within a certain pH-range, belong, for example, the following compounds:

Linear polyamides soluble in water or in methanol diluted with water and containing in the chain components with hydrophilizing ether groups such as radicals of dicarboxylic acids and/or of diamines, primarily linear synthetic, nitrogen-containing compounds of high molecular weight which are soluble due to salt-forming groups, especially such groups as contain basic trivalent or pentavalent nitrogen or isothiourea groups or which are soluble owing to the presence of carboxyl groups or which are water-soluble in the form of their salts, and which can be processed well together with the polyvinyl alcohol or its water-soluble derivatives. Substances of this kind are, for example:

(1) Basic polyamides obtained from dicarboxylic acids or their esters, such as adipic acid diphenyl ester, adipic acid-bis-thiomethyl ester, oxalic acid dimethyl ester and di-primary polyamines, such as diethylene triamine, di-1:3-propylene triamine, N-methyl-N-di-γ-aminopropyl-amine.

(2) Basic polyurethanes, for example the reaction products obtained from hexamethylene diisocyanate with N-methyl-di-[β-hydroxyethyl]-amine or N:N′-di-[β-hydroxyethyl]-piperazine; polyurethane obtained from 3 mols of hexamethylene diisocyanate, 2 mols of N-methyl-di-[β-hydroxyethyl]-amine and 1 mol of 1:4-butanediol.

(3) Basic polyureas, for instance the polyureas obtained from hexamethylene diisocyanate and N-methyl-N-di-[γ-amino-propyl]-amine or from tetramethylene diisocyanate and N-methyl-di-N-ε-aminoamylamine.

(4) Polyisothioureas, for instance the polythiourea obtained from carbon disulfide and heptamethylene diamine, subsequently methylated with methyl bromide.

(5) Polyguanidines, such as the polyguanidine obtained from hexamethylene diamine.

(6) Linear polyureas with lateral carbamyl groups, obtained from polyamines of a preponderantly linear constitution with secondary basic nitrogen, for example the reaction products of polyethylene imine with cyanic acid, furthermore polyureas with lateral urea-groups obtainable by reaction of basic polyamides having secondary nitrogen with cyanic acid or alkyl isocyanates. Polyamides of the latter kind are, for example, the polyamides of oxalic acid with diethylene triamine and di-1:3-propylene-triamine.

(7) Water- or alkali-soluble linear polysulfonamides, for example the reaction product of tetramethylene-disulfochloride and tetramethylene diamine.

With preference there are used polyamide compounds which themselves alone yield solid threads or films. However, the process is not limited to the use of such highly polymeric substances. Relatively short-chained linear polyamide compounds possessing a suitable solubility, which compounds do not form self-supporting films, can also be used for the process of the invention. Compounds of a strictly linear constitution are preferred. However, moderate branchings are also admissible so long as the molecule has, broadly speaking, a linear character. The above-mentioned polyethylene imine which, according to its method of preparation, may have minor branchings, serves as an example of this kind. Molecules having more branched chains or being of a flat or spherical form, such as the still soluble amido-plastics based on urea or melamine, are not included. The linear molecules can much more easily be incorporated into the fibers and other structures. Their special advantage resides in the fact that they facilitate the spinning and stretching process when using, for instance, the spinning funnels customarily used for cuprammonium rayon. Finally, they permit of influencing the physical properties of the finished products in the desired direction to a far greater extent than, for example, the methylol-urea compounds.

When using amide compounds of the group (a), it is not necessary to dissolve the finished polymer in the spinning or casting solution. Reactive monomers such as the amides of acrylic acid or methacrylic acid can be added in the required quantity or the polyvinyl alcohol components can be dissolved in an aqueous solution of the amide and then the polymerization effected "in situ" by addition of a substance initiating the polymerization, for instance a peroxy-compound such as ammonium persulfate. Polyvinyl alcohol solutions containing one or more monomeric amide compounds with vinyl groups capable of polymerization can even be extruded into a precipitating bath containing in sufficient quantity the substance initiating the polymerization. Consequently the formation of the polyamide compounds can be combined with the shaping process.

Finally, the spinning solution can contain a polyvinyl alcohol the macromolecule of which already contains amide groups so that, in order to carry out the process according to the invention, the additional use of further linear polyamides containing amide groups is not absolutely necessary. Naturally, it is possible in any particular case to add such a polymer with the object of improving the capacity for dyeing or the resistance to creasing.

The percentage of polyamide compounds contained in the spinning or casting solution or the proportion of amide groups to polyvinyl alcohol radicals in the shaped product can vary within wide limits, for instance between 4% and 60%, calculated upon the combination of polyvinyl alcohol and polyacrylic acid amide. These figures are not quoted to make a definite limitation as, generally, the excellent compatibility of the polymers in question cannot be assessed on a quantitative basis but depends on the molecular weight and, in addition, the influence of the amide polymers upon the physical properties of the final products may also differ very much. The percentage of polyamide components in the case of mixtures of polyvinyl alcohol and water-soluble, basic polyurethanes of high molecular weight, for instance, can be very high. With 80 percent of film-forming polyurethane of high molecular weight obtained from hexamethylene diisocyanate and N-methyldiethanolamine 1:1 and only 20 percent of polyvinyl alcohol, there is obtained a very good, flexible and soft thread possessing an excellent affinity for dyestuffs. In spite of the low melting point of the polyurethane, this thread was found to be completely fast to boiling.

When high percentages of polyacrylamide are used, comparatively hard threads are obtained. In order to avoid the thread becoming too hard, the reaction with carbonyl compounds is either carried out under milder conditions, for instance at a lower temperature, at a comparatively low concentration of the carbonyl compound or for a short time only, or by replacing the formaldehyde wholly or partially by a more mildly reacting carbonyl compound as, for example, diacetyl. In contradistinction to the latter, glyoxal leads to comparatively hard and stiff threads or foils. The formation of harder structures is particularly promoted if many primary amide groups are present, whilst, on the other hand, linear polymers with amide groups in the chain tend to form softer threads etc. which are nevertheless fast to boiling. As a rule, the quantity of the polyamide compound may be the larger, the less reactive amide groups the additive contains and the more slowly the functional groups react with formaldehyde or other carbonyl compounds. Amongst the condensation polymers the ordinary polyamides (carboxylic acid amides) are less reactive than comparable polyurethanes and these in their turn are surpassed by the polyureas as regards reactivity. Condensation polymers with primary amide groups in the side chains, such as the reaction product of linear-polymeric amino compounds with secondary amino nitrogen and cyanic acid, react as rapidly and easily with carbonyl compounds as the polyacrylic acid amide and similar polyvinyl amides.

In order to precipitate the solution in the form of threads, bands and the like, there may be used any precipitating baths known per se for polyvinyl alcohol, such as very dilute aqueous solutions of sodium sulfate, magnesium sulfate or ammonium sulfate which, according to the nature of the spinning solution or with the object of producing particular effects, may be neutral, acid or also alkaline in reaction. The precipitating bath may already contain a hardening agent, preferably formaldehyde. Concentrated solutions of ammonium sulfate have proved to be most advantageous. When spinning into formaldehyde-containing baths solutions of ammonium sulfate are also most advantageously used. Normally, i.e. when polyvinyl alcohol is present in a larger quantity than the polymeric additives containing amide groups, the bath should contain neutral salts beside the bisulfate formed by addition of sulfuric acid. Moreover, the formaldehyde content should not be too low if a strong acetalization is desired in the first bath. When an ammonium sulfate solution of 45 percent strength is employed, it is of advantage to use more than 2 percent of formaldehyde. A suitable bath is obtained, for instance, by adding (metric scale) 8 parts by weight of sulfuric acid and 5 parts by weight of paraformaldehyde to 100 parts by volume of an ammonium sulfate solution of 45 percent strength. This solution is advantageously used at about 65° C. Satisfactory results have been obtained by means of baths having a composition of between 45 percent of ammonium bisulfate+6 percent of ammonium sulfate and 18 percent of ammonium bisulfate+45 percent of ammonium sulfate, the formaldehyde content amounting to between 2.6 to 3.5 parts by weight calculated upon 100 parts by volume. These figures relate chiefly to mixtures of about 85 to 90 parts of polyvinyl alcohol and 15 to 10 parts of polyacrylamide. They are merely quoted for guidance but do not constitute a limitation. For certain methods of execution of the process it is of advantage merely to carry out a prehardening in the precipitating bath. This prehardening with formaldehyde in bisulfate-containing baths of ammonium sulfate has proved to be of advantage insofar as, after stretching in dry heat, threads of polyvinyl alcohol and, for instance, polyacrylamide can, either on their way to the reeling device, i.e. continuously, or when wound on a perforated reel, i.e. discontinuously, be treated directly with the chloride hardening baths described below at temperatures between 90–95° C. without running the risk of becoming agglutinated.

While it is understood that the hardening precipitating baths must have an acid reaction, this is also recommended for the spinning bath in the absence of carbonyl compounds, above all, according to the invention, when the polymers with amide groups contain acid groups, particularly carboxyl groups, and, in the form of the free acid, are sparingly soluble or insoluble in water. On the other hand, alkaline precipitating baths can be of advantage in the case of additives with decidedly basic groups which become water-soluble by forming salts with acids, such as linear polyamides with basic secondary or tertiary nitrogen in the chain. As alkali, ammonia is particularly appropriate and it may be used in a comparatively high concentration, for instance in a quantity of 2–5 percent, in some cases without the addition of a salt. Alternatively there may be used salts giving an alkaline reaction such as sodium carbonate, secondary and tertiary sodium phosphate or sodium borate. In the case of these latter salts also, the baths need not contain an additional amount of neutral salt in a high concentration, as in any case the composition of the precipitating baths must be adjusted to the hydrophilic and swelling properties of the threads at the pH-value of the spinning bath. The same applies when polymers with acid groups are used, and in this case dilute sulfuric acid without the addition of salt may also serve as precipitating bath, for instance if relatively hydrophobic polymeric acids such as copolymers of maleic acid or maleic monoamide acid and styrene are used as free acids.

If an acid or alkaline reaction converts the amide component into the free base or the free acid which is of a relatively hydrophobic nature, it is easier to free the spinning threads from the salts of the precipitating bath by rinsing with cold water, for instance at 4–10° C., immediately after precipitation, and to dry them prior to stretching in dry heat with possible subsequent treatment with carbonyl compounds, without the capillary threads becoming agglutinated. In any case it is of advantage, particularly if the process is carried out under tension, to provide for a separation of the single capillaries and an easier opening of the slivers or cables by the use of a suitable preparation, for instance by means of a cation-active textile auxiliary if the fiber has an acid character and by an anion-active one if the fiber is basic. Such a treatment should also be adopted even if there are no salt-forming groups. Of the textile auxiliaries having an affinity for the fiber, there are preferred in this case the cation-active auxiliaries. In addition, it has been found that the presence of polymeric amide compounds, even if they have neither acid nor decidedly basic properties, as is the case with polyacrylamide, still provides a more or less effective protection against undesired agglutination. Furthermore, it has been found that the tendency to agglutinate can be reduced considerably by a treatment with carbonyl compounds prior to hardening, if the precipitation is effected in a comparatively warm to hot precipitating bath, for instance between 60° C. and 100° C., during an adequate period of time. With an appropriate composition of the precipitating bath, the temperature can be still further increased, for instance to 105° C.–110° C.

For rinsing the spun threads which may contain formaldehyde, particularly with continuous working, there may be used according to the invention aqueous solutions of salts which, on account of their hygroscopicity, in contradistinction to the salts of the precipitating bath and/or the hardening baths, do not tend to crystallize or only yield soft crystals which do not damage the individual threads which are particularly sensitive in the state of primary swelling. Such salts are for instance ammonium acetate or alkali acetates. Insofar as the added nitrogen-containing polymers contain carboxyl groups beside the amide groups, it is possible to compensate the hydrophilic properties by an after-treatment with hydrophobic cations, for insance by treating with metal salts such as barium, zinc, cadmium or copper salts. In addition, there are also suitable for this after-treatment organic bases or salts thereof, such as dodecyltrimethyl-ammonium chloride, β-naphthylbiguanide, dodecylguanidine, and other mono- or polyvalent organic bases such as are used for rendering dyeings with substantive dyestuffs fast to water and washing or for the fixing of tanning agents. Hence it follows that such measures also prevent the agglutination of individual threads during the drying process.

For hardening the threads, which operation is sometimes carried out in one step, mostly, however, in several steps, there is preferably used formaldehyde or a substance which easily splits off formaldehyde. The formaldehyde may be wholly or partially replaced by other reactive carbonyl compounds, such glyoxal, methylglyoxal, acrolein, furfural, succinic acid dialdehyde, diacetyl and the like. Mixtures of formaldehyde and glyoxal are often advantageous. Calculated upon equal quantities of total carbonyl, the action of formaldehyde is increased in the first case by glyoxal but in the second case moderated by diacetyl.

As suitable acids for catalyzing the acetalization there may be named hydrogen halides, preferably hydrogen chloride. Other strong acids such as sulfuric acid, aminosulfonic acid, perchloric acid, trichloracetic acid and benzenesulfonic acid may also be used. The acid content of the hardening baths may vary within wide limits, in the case of hydrogen chloride, for instance, between about 0.5 and 10 percent. It is of advantage if the hardening baths contain salts, even if they do not serve at the same time as precipitating baths. With preference there are used salts with anions of the acids used, such as sodium chloride, ammonium chloride, sodium sulfate or ammonium sulfate. In order to intensity their efficacy, the acid baths may contain small quantities of sufficiently soluble surface-active acids, such as octylsulfuric acid, isononyl-1-sulfonic acid and tertiary butylbenzenesulfonic acid.

A bath has, for instance, proved to be very advantageous which contains about 30 percent of sodium chloride, 5 percent of formaldehyde and 0.5–5 percent of hydrogen chloride, the indicated salt concentration approaching saturation. Further raising of the content of formaldehyde and of hydrogen chloride diminishes the saturation content of the salt.

Instead of or in addition to formaldehyde there may also be used reactive derivatives thereof, for instance bisulfite compounds such as glyoxal-bisulfite, furthermore N-methylol compounds such as dimethylol-urea, tetramethylol-acetylene diureine, bis-methylol compounds of glycol-bis-carbamic acid esters, ethers of such methylol compounds with aliphatic alcohols such as methanol or ethanol, furthermore polymethylolmelamines or their ethers, and more highly condensed, still acid-soluble formaldehyde melamine compounds so far as they still contain reactive methylol or methylol ether groups. Aldehyde derivatives with reactive halogen such as α:β-dichlorodioxane may be used. If desired, they can, when dissolved in indifferent organic solvents, such as tetrahydrofurane or dioxane, be used for treatment of the shaped, already prehardened structures. Since, generally, methylol compounds are affected by acids even at low temperatures, it is preferable to mix such compounds with substances which split off strong acids such as dimethyl sulfate, γ-chlorobutyric acid or arylsulfonic acid alkyl ester, and to bring the mixture into contact with the structures, whereupon the reaction is started by heating.

The carbonyl compounds, particularly formaldehyde or other substances which split off formaldehyde, such as polyhydroxy-methylene acetate, paraformaldehyde, aldehyde derivatives, such as glyoxal bisulfite, furthermore compounds which react in the same way, for instance methylol compounds, may be incorporated in the spinning solution, if desired in dispersion. The action, for instance a prehardening, is initiated by an acid content in the precipitating bath or by heating of the threads in the presence of substances which split off acid.

The process may also be carried out by causing formaldehyde to exert an effect in the precipitating bath or in baths for after-treatment in a weakly alkaline medium. Cross-linking is then effected in a subsequent acid bath or by heating in the presence of acid or of a substance which splits off acid. In the case of less easily reacting amide compounds, the threads in the form of wound masses may be subjected to this alkaline treatment in apparatus or the spun cables may be subjected to this treatment in storage tanks before or after their stretching.

The treatment with the carbonyl compounds or their derivatives, especially with formaldehyde, may be carried out in one or more steps, as already mentioned. The precipitating bath proper can contain acid and aldehyde and can be caused to take effect under such drastic conditions as regards concentration, temperature and length of time, that the desired degree of acetalization is already attained during the first step of the treatment. Such a method of working is suitable for foils which need not be greatly stretched and the unilateral orientation of which is even undesirable. As a rule, the actual hardening will be carried out in a later step, for instance in connection with a stretching process in a hot bath or only after a stretching process in dry heat. A practical method of working, for instance, is the division of the spinning bath into a portion for precipitating and a portion for stretching, the latter being kept at a considerably higher temperature than the former, the precipitating zone at, for instance, 60° C.–65° C. and the stretching zone at 80° C.–105° C. Rapid processing is usually necessary if the operation is carried out discontinuously with prehardening, as the material, according to the choice of the acetalization agent and the intensity of the treatment and according to the type of amide component, shows a variable stability on storage.

Preferably the treatment with aldehydes or other carbonyl compounds is carried out under tension, at least until the threads have reached a degree of hardening which renders impossible a considerable spontaneous shrinkage even at a low temperature. In many cases it is important that, particularly in the first hardening bath but also in any following acetalization baths, the thread retain a certain capacity for shrinkage. Even in the case of already oriented threads this longitudinal shrinkage can be compensated or even overcompensated, by subsequent stretching. Threads of polyvinyl alcohol and polyacrylamide, for instance, can be prehardened just so so far that, at least during a short duration of action, they no longer agglutinate in water at room temperature (18° C.–30° C.). They are then freed from any residual substances of the precipitating bath by washing with water to which a substantive brightening agent, preferably of the cation-active type, such as stearoyl-triethylene tetranine, has been added. They are dried under slight tension, if desired, then stretched in the hot state, and finally hardened.

The total degree of elongation may vary within wide limits, ranging, for instance, from 40 percent to 500 percent of the initial length. Sometimes, the threads can even be further stretched, particularly if the stretching is carried out in steps upon the swelled thread. The stretching in aqueous liquids, for instance in concentrated solutions of salts such as ammonium sulfate, is most advantageously carried out between 50° C. and 110° C., it being of advantage to heat the thread to a higher temperature during its run through the stretching spaces interrupted by the guiding and brake devices. The stretching in the dry state, for instance in a hot air current between heated rolls or in infra-red radiation, which is particularly advantageous for the manufacture of endless threads, is best carried out between 100° C.–225° C., preferably between 130° C. and 160° C. In this stretching process spinning cables are conducted as wide as possible. Thereupon follows the acetalization which, in the case of card slivers, is best carried out continuously on a transporting device with a gradual increase in the temperature in the direction of motion.

Furthermore, it has been found that it is useful, after the stretching and hardening, to re-fix the threads and render them shrink-resistant by heating for a prolonged time to elevated temperature with or without tension. This treatment is best carried out at temperatures between 110° C. and 210° C., preferably between 120° C. and 140° C. and can proceed, for instance, for from about 3 minutes to about 1 hour. This fixation treatment can also be carried out continuously upon the running thread or cable without difficulty. In order to render the threads completely fast to shrinking, they can be after-treated, if necessary in processing apparatus, for 5-30 minutes with boiling water containing auxiliary substances such as urea, for instance in a quantity of 5-10 grams per liter.

When it is required to produce staple fibers by the process of the invention, the stretched and hardened cable can be crimped mechanically before or after cutting to staple length and then, for fixation of the crimping and for stabilization of the length, can be after-treated in dry or moist heat between about 100° C. and about 140° C., if desired in processing apparatus. The shoving chamber process is preferred for crimping the fiber, the crimping process in the shoving chamber being promoted by the action of steam or better still by water superheated above 100° C. By after-treating the crimped and hardened threads or fibers at the boil the crimping can, in some cases, be further improved, i.e. rendered more voluminous and more permanent; the length is fixed at the same time.

The fibers and threads obtained according to the process of the present invention, which can be modified to a wide extent regarding their physical properties such as hardness, swelling property, elasticity, resistance to creasing, thermal resistance, hydrophilic properties and tinctorial properties, are suitable, according to their type and makeup, to be worked up alone or in mixture with other natural and artificial fibers such as wool, cotton or staple fibers of regenerated cellulose. Owing to their relatively hydrophilic character they are especially suitable for mixing with polyamide fibers and other still more hydrophobic synthetic fibers such as fibers of polyacrylonitrile or polyalkylene terephthalic ester.

The fibers obtained according to the process of the present invention, when they contain basic nitrogen, shows a particularly good affinity for dyestuffs. They can easily be dyed in a hot bath with acid dyestuffs including the chrome complex dyestuffs and the chrome developed dyestuffs.

Linear polyamide compounds based on polyvinyl alcohol, such as polyacrylic acid amide, are preferably added in quantities between about 4 percent and 30 percent calculated upon the total quantity of the polymeric substance, whilst condensation polymers of a linear constitution, especially the basic linear polyamide compounds, are preferably used in a quantity exceeding 10 percent. It is of advantage to combine polyvinyl alcohol or derivatives thereof with a comparatively small quantity of a polyvinyl-polyamide, such as polyacrylic acid amide, or of the copolymer, reacted with ammonia, obtained from maleic acid anhydride and vinylmethyl ether and of a linear condensation polyamide preferably containing basic nitrogen and advantageously in a quantity exceeding that of the vinylpolyamide. The following proportion is, for instance, suitable: 65 parts of polyvinyl alcohol, 25 parts of a strongly basic condensation polyamide and 10 parts of polyacrylic acid amide.

The process of the present invention is particularly suitable for the continuous manufacture of endless slivers to be worked up to staple fiber. In this case it is of advantage further to subject the non-hardened or only slightly hardened endless thread bundles, which have, preferably in a spread-out state, been stretched in dry heat, to a treatment with the hardening agent in a washing channel in which they can be laid in windings or loops in order to save space. The temperature in the treating channel is preferably raised in the direction of the run of the thread, for instance from about 60° C. to about 100° C.-110° C. In the first zone, the hardening zone, the cable is advantageously kept under tension, a slight shrinkage occurring before the cable enters the tension or stretching zone not being detrimental. After being freed from the hardening agent and after being dried, the cable can, for a better fixation, be guided through a heating zone at more than 100° C. and can finally be crimped mechanically in the presence of hot water or steam. However, this intermediate heating can be omitted, especially if the crimping is carried out at the required high temperature. The shrinkage at the end of the processing is not absolutely necessary, this can also be carried out upon the finished articles, such as knitting yarn or woven or knitted fabrics. In this way there are obtained soft, close textiles of good handle and, in addition, the shrinkage treatment can be combined with the application and fixation of certain finishing materials or with dyeing processes, for instance with vat dyestuffs which do not easily penetrate close articles.

The following examples serve to illustrate the invention but they are not intended to limit it thereto, the parts being by weight:

Example 1

A spinning solution containing 12 percent of polyvinyl alcohol of a degree of hydrolysis of 98 percent (viscosity of a solution of 4 percent strength at 20° C=20.0 centipoises) and 1.2 percent of a highly polymeric polyacrylic acid amide is, under a pressure of 4 atmospheres' gauge pressure, extruded through a spinning nozzle with 55 perforations each having a diameter of 0.09 mm. into solution of ammonium sulfate of 45 percent strength heated to 55° C. With a length of the precipitating bath of 90 cm. the thread is drawn off at a speed of 20 meters per minute. The thread washed on the bobbin with an aqueous solution of ammonium acetate of 20 percent strength is then dried, twisted, and at 155° C. stretched to 260 percent of the initial length. Subsequent to stretching, the thread is after-twisted by means of a ring spindle and then after-treated on an elastic support in the form of a cylindrical bobbin for 5 hours at a temperature gradually rising from 50° C. to 70° C. in a formalizing bath consisting of 20 percent of sodium chloride, 5 percent of hydrogen chloride, 5 percent of formaldehyde, and 70 percent of water. The thread thereby shrinks by about 16 percent, calculated upon the initial length after stretching. The hardened thread is washed until free from acid, is dried at a low temperature and subsequently heated without tension for 20 minutes at 120° C., this causing a further small reduction of the length. Finally the thread is made to shrink once more by treatment with boiling water. The shrinkage amounts to about 30 percent altogether calculated upon the length after stretching.

If the process is carried out in the same way but without addition of polyacrylic acid amide, the total shrinkage is much higher and amounts to about 70–80 percent.

Example 2

An aqueous solution containing 15 percent of polyvinyl alcohol and 1.5 percent of highly viscous polyacrylic acid amide is spun into a precipitating bath consisting of a solution of ammonium sulfate of 45 percent strength which is heated to 60° C. at the place where the thread enters the solution and to 102° C. at the exit point of the thread. The thread which is stretched in the spinning bath between a friction roller and the exit point of the thread to 200 percent is taken up by a spinning centrifuge in which it is first washed with water at 5° C. until free from salt and then prepared with an aqueous solution of dimethyl-palm oil-alkyl-benzyl-ammonium chloride of 1 percent strength.

After drying the cake in a drying closet heated to 60° C., the thread is after-stretched, in a hot air current at 160° C., by a further 100 percent of the initial length and after-twisted by means of a double twist spindle making 120 revolutions per meter. The material, being now on a perforated bobbin in the form of a cake, is formalized in a pressure apparatus in the course of one hour at a temperature rising from 25° C. to 95° C. with a solution containing per liter 200 grams of sodium chloride, 10 grams of hydrogen chloride, and 60 grams of formaldehyde. The cake is taken off the support and made to shrink by boiling for 15 minutes in water.

The thread so obtained is completely fast to boiling and free from agglutination.

*Example 3*

A solution of 16.4 parts of polyvinyl alcohol (polyvinyl acetate of which 98 percent is hydrolized) and 1.6 parts of monomeric acrylamide in 82 parts of water is, after careful filtering, spun through a spinning nozzle with 30 perforations each of a diameter of 0.09 mm., into a precipitating bath heated to 60° C. containing 43 percent of ammonium sulfate, 1 percent of sulfuric acid, and 0.5 percent of ammonium persulfate. The thread guided through a bath of 90 cm. length at a speed of 29 meters per minute is, after leaving the spinning trough, washed with an aqueous solution of ammonium acetate of 20 percent strength, twisted while still damp, and dried at room temperature. The dry thread is stretched in a hot air current at 160° C. to 225 percent of the initial length and, in winding up is after-twisted by means of a cap spinning frame.

For hardening the thread is treated in the form of a hank in a bath containing 20 percent of sodium chloride, 5 percent of formaldehyde and 5 percent of hydrogen chloride. The thread is caused to shrink by about 30 percent by treatment for 6 minutes at 30° C. and is then stretched again to the initial length while rapidly raising the temperature to 57° C. and treated for 6 minutes in a hardening bath at a temperature rising from 65° C. to 82° C. Finally the threads are rinsed with a dilute solution of sodium acetate and washed with water. The finished threads shrink in boiling water by about 30 percent and are then fast to boiling and shrinking. On dyeing them with 2.5 percent of Indanthrene Blue GCD according to the usual dyeing process, there are obtained vivid tints having good fastness properties.

*Example 4*

The non-stretched threads obtained according to Example 3 are placed in the hardening bath of Example 3 in the form of hanks. They are allowed to shrink for 3 minutes at 26° C. and then stretched in the same bath to 240 percent of the initial length at a temperature rising from 70° C. to 80° C. After stretching, the hardening solution is allowed to take effect for another 2 minutes at 80° C. The threads are rinsed with sodium acetate solution and with water and dried for 20 minutes at 120° C.-125° C. In boiling water they shrink only by 27 percent and are then fast to boiling and shrinking. At an individual titre of 1.6 grams per denier they show a tensile strength of 2.1 grams per denier and an elongation at break of 44 percent.

*Example 5*

To a solution, prepared in the hot, of 60 parts of polyvinyl alcohol in 340 parts of water there are added, after filtering, 6 parts of monomeric acrylamide and 0.6 part of ammonium persulfate. The whole is then allowed to stand at 20° C. In the course of 15 hours the viscosity (falling ball; steel ball of diameter 5 mm., falling distance 20 cm.) rises from 28 seconds to 85 seconds, then in the course of an additional 6 hours to 107 seconds. After ripening for 21 hours, the spinning solution is spun through a nozzle with 30 perforations each of a diameter of 0.09 mm. into a saturated ammonium sulfate solution containing 1 percent of sulfuric acid and heated to 64° C. The threads are drawn off at a speed of 50 meters per minute, washed, on their way to the winding up device, with an ammonium acetate solution of 15 percent strength, pre-dried by means of a warm air current and twisted while still damp. Thereupon they are conducted through an aqueous hardening bath containing 20 percent of sodium chloride, 5 percent of formaldehyde and and 1 percent of hydrogen chloride. After passing a brake cylinder, the somewhat shrunken thread is stretched intensively and, on the winding-up bobbin, aftertreated for 5 minutes in the same hardening bath at 99° C. The wound masses are washed until free from acid, hydro-extracted vigorously and heated on a perforated bobbin for 20 minutes to 130° C. while drawing hot air through. When boiled with water without tension, these threads shrink by 30 percent. They are then pure white, not agglutinated and completely fast to boiling and shrinking. With Astra Cyanine Blue there are obtained deep shades which are fast to washing and boiling. 5 percent of the dyestuff is taken up.

*Example 6*

13.4 parts of polyvinyl alcohol and 1.34 parts of partially hydrolized polyacrylonitrile which, according to analysis, corresponds empirically to a copolymer of about 58 parts of acrylamide and about 42 parts of ammonium acrylate, are dissolved in 85.3 parts of water. The spinning solution produced, which showed a viscosity (falling ball) of 62 seconds, is spun through a nozzle with 30 perforations each of a diameter of 0.09 mm., into an ammonium sulfate solution, saturated at 50° C. and containing 1 percent of sulfuric acid, the bath being at a temperature of 64° C. The thread, drawn off at a speed of 65 meters per minute, is, after leaving the precipitating bath, rinsed with an ammonium acetate solution of 20 percent strength, pretwisted in the almost dry state and subsequently dried at room temperature. While stretching them to 250 percent, and with a time of dwell of 1.5 minutes, the threads are passed through a hardening bath which contains 20 percent of sodium chloride, 5 percent of formaldehyde, and 1 percent of hydrogen chloride and is heated to 74° C. The wound up and hardened threads are aftertreated on the bobbin for another 5 minutes at 90° C. while circulating the hardening solution by pumping. They are then rinsed with a dilute solution of sodium acetate and with water, vigorously hydro-extracted and, while drying, heated for 20 minutes at 130° C. On boiling with water, the threads shrink by 25 percent and are then fast to boiling and shrinking.

Due to its content of carboxyl groups, the fiber material obtained shows a strong affinity for basic dyestuffs. In the case of Methylene Blue, for instance, 4 percent and of Astra Cyanine Blue 7 percent is absorbed. The dyeing obtained with Astra Cyanine Blue is very fast to washing and boiling.

*Example 7*

To a solution of 15 parts of polyvinyl alcohol in 65 parts of water there is added a solution of 10 parts of the polyurethane from equal molar proportions of hexamethylene diisocyanate and N-methyl-bis(β-hydroxyethyl)-amine, in 20 parts of acetic acid of 10 percent strength. The spinning solution produced, having a viscosity (falling ball) of 40 seconds, is spun at a draw off speed of 20 meters per minute into an ammonium sulfate solution of 43 percent strength containing 10 percent by volume of concentrated ammonia and having a temperature of 64° C. The freshly spun threads are washed with water at 5° C. until free from salt, well hydro-extracted, dried at 65° C. and subsequently stretched in hot air at 155° C. to 235 percent of the initial length. For hardening, the threads in the form of hanks are first caused to shrink slightly under a slight tension and then at 95° C., are afterstretched to a length exceeding the initial length by 10 percent. During the stretching the temperature of the bath (see Example 6) is raised to 70° C. within 9 minutes. Under tension the threads are retained for another 6 minutes at 70° C.–80° C. in the hardening bath, rinsed thoroughly, dried under tension and caused to shrink in boiling water. The reduction in length amounts to 28 percent. The thread, which is now fast to boiling and shrinking, has a tensile strength of 1.9 grams per denier at an elongation at break of 19 percent. It is distinguished by a good color and soft handle and is dyed in very deep tints by means of acid dyestuffs.

Example 8

Threads obtained according to Example 7 but still unstretched are treated at 94° C. in the hardening bath described in Example 6 while being stretched to about 250 percent. The time of dwell amounts to about 1.5 minutes. The threads wound up on the bobbin are then aftertreated for another 5 minutes at 90° C. in the hardening bath. After washing and reheating to 130° C., the threads shrink in boiling water by about 20 percent. The threads which are now fast to boiling absorb from a boiling liquor containing formic acid 8 percent of Palatine Fast Black WAN or 8 percent of Sirius Supra Blue G. There are obtained, respectively, pure black and deep dark blue dyeings, which are fast to boiling, soaping and rubbing.

Example 9

A solution of 30 parts of polyvinyl alcohol in 170 cc. of water is, in the hot, stirred with a solution of 3 parts of the basic polyurethane mentioned in Example 7 in 17 parts of acetic acid of 10 percent strength and, after careful de-aeration, spun as described in Example 7. The dried threads stretched in hot air at 160° C. to 180 percent are now drawn through the hardening bath described in Example 6 and then, at 65° C.–70° C., stretched to a length exceeding the initial length by 10 percent. The time of dwell in the hardening bath amounts to about 1 minute, the duration of rehardening on the bobbin at 90° C. is 5 minutes. After rinsing with water containing sodium acetate, the threads are dried at 130° C. without tension, whereby a reduction of length of 12 percent is effected. On boiling in water, the threads shrink again by 20 percent of the length attained after drying.

For comparison, the threads may also be dried on an inflexible bobbin, whereby, after boiling without tension, the final length is about the same. When omitting the rehardening at 90° C., the threads shrink twice as much.

Example 10

A solution of 16.5 parts of polyvinyl alcohol and 1.6 parts of polyacrylamide in 82 parts of water is spun into a precipitating bath heated to 65° C. which contains 43 percent of ammonium sulfate. The threads drawn off at a speed of 30 metres per minute are washed with an ammonium acetate solution of 20 percent strength, twisted while damp and then stretched at 160° C. in the dry state of 230 percent of the initial length. The threads retwisted at 120 revolutions per metre are further treated, on a perforated bobbin in a device for washing under pressure, for 40 minutes at a temperature rising from 25° C. to 95° C. and then for another 5 minutes at 95° C., with a hardening solution containing 25 percent of sodium chloride, 5 percent of formaldehyde, and 1 percent of hydrogen chloride. The threads freed from acid by washing with water containing sodium acetate, are gradually heated to 130° C. and kept at this temperature for an additional 30 minutes, shrinkage being avoided. Finally they are caused to shrink without tension in the form of a loosely wound ball. The reduction in length amounts to 30 percent. The solid threads so obtained are free from agglutinations and show a good handle. They have a tensile strength of 2.58 grams per denier at an elongation at break of 25 percent. The individual titre amounts to 3.1 deniers.

Example 11

With simultaneous prehardening, a solution of 13.1 parts of polyvinyl alcohol and 1.3 parts of polyacrylamide in 85.6 parts of water is spun into a bath heated to 65° C. and containing in 100 cc. 18 grams of ammonium bisulfate, 45 grams of ammonium sulfate, and 5 grams of formaldehyde (the latter being added in the form of paraformaldehyde). The threads drawn off at a speed of 23 metres per minute are first washed with sodium acetate and then with water, predried at 65° C. and twisted while still a little damp. In this state the threads contain 11.1 percent of formaldehyde bound in a hydrolyzable form. They are then stretched in an air current at 160° C. to 225 percent of their initial length and subsequently hardened on the bobbin, in a device for washing under pressure, with a solution containing 20 percent of sodium chloride, 5 percent of formaldehyde, and 1 percent of hydrogen chloride. At the beginning of the extrusion, the temperature of the bath amounts to 68° C. Within 15 minutes it is raised to 93° C. The threads are first washed with a dilute solution of sodium acetate and then with water, then hydro-extracted and dried. They are heated for 20 minutes at 130° C. and subsequently caused to shrink in boiling water in the form of a loosely wound ball. The threads stretched in this way are free from agglutinations and completely fast to shrinking and boiling. They have an individual titre of 0.6 denier and a dry tensile strength of 2.0 grams per denier at an elongation at break of 40 percent. The whole processing is carried out within 2 hours. On storing the prehardened bobbins for a prolonged time, the stretching capacity at 160° C. decreases. After being stored for 24 hours at room temperature, the threads could no longer be stretched.

Example 12

An aqueous solution of a highly viscous polyvinyl alcohol containing 10 percent of acrylic acid amide in the macromolecule (obtained by re-esterification of the corresponding copolymer of vinylacetate and acrylic acid amide) is spun and worked up as described in Example 10. The thread drawn out in boiling water is fast to boiling and shrinking.

Example 13

An aqueous solution containing 15 percent of polyvinyl alcohol and 1 percent of a highly viscous polyacrylic acid amide (falling-ball viscosity of the spinning solution 77 seconds at 20° C.) is spun into an ammonium sulfate solution of 43 percent strength, heated to 66° C. and containing 1 percent of sulfuric acid. The thread drawn off at a speed of 32 metres per minute is rinsed, at room temperature, with an ammonium acetate solution of 20 percent strength, twisted in a half-dry state and, from the twisting bobbin, stretched in hot air at 160° C. to 210 percent of the original length. Subsequently the material in the form of hanks is introduced at 24° C. into a solution containing 20 percent of sodium chloride, 1 percent of hydrogen chloride and 5 percent of formaldehyde. The hanks which thereby shrink by about 25 percent are stretched in a bath gradually heated to 75° C. to their initial length which they reach before the temperature has risen to 60° C. The heating to 75° C. lasts altogether 15 minutes. Thereupon the hank is rinsed with water containing sodium acetate, dried at 60° C., and heated for 20 minutes under tension to 130° C. When boiled in water, the thread shrinks by about 40 percent. Calculated upon the length after stretching, the total shrinkage amounts to about 50 percent. The threads which are now completely shrunk and fast to boiling show a dry tensile strength of 2.98, a wet tensile strength of 1.60 grams per denier, an elongation at break in the dry state of 29.5, in the wet state of 48 percent, at an individual titre of 2.2 deniers. According to analysis, the material contains 15.3 percent of formaldehyde bound in a hydrolyzable form.

Example 14

An aqueous solution containing 18 percent of polyvinyl alcohol (viscosity in an aqueous solution of 4 percent strength at 20° C.=20.0 centipoises) and 1.8 percent of a highly viscous polyacrylamide is spun through a slit nozzle of 5 mm. length and 0.3 mm. width into an aqueous precipitating bath heated to 75° C. containing 20 percent of sodium chloride, 5 percent of hydrogen chloride, and 5 percent of formaldehyde. The narrow band which is conveyed through the bath within 3 minutes at a speed of 5 metres per minute is easily lifted off the conveyer belt and is washed with water, then with a dilute solution of sodium acetate and again with water. It is further run over a drying roller to the winding-up bobbin. Even without afterheating to temperatures above 100° C. the band is fast to boiling and practically fast to shrinking.

Example 15

An aqueous solution containing 15 percent of polyvinyl alcohol and 1.5 percent of highly viscous polyacrylamide is spun through the slit nozzle mentioned in Example 14 at a drawing-off speed of 10 metres per minute into an aqueous solution of ammonium sulfate of 45 percent strength heated to 90° C. After leaving the precipitating bath, the narrow band is rinsed with an aqueous solution of ammonium acetate of 15 percent strength, drawn through an air space which is heated, in the direction of motion, from 180° C. to 300° C. and here stretched to 250 percent of the initial length. After leaving the stretching zone, the band is conveyed over a transporting winder on which it is aftertreated for 3 minutes with an acetalization solution heated to 75° C. and containing 20 percent of sodium chloride, 10 percent of formaldehyde, and 1 percent of hydrogen chloride. In order to avoid a too high tension due to contraction, the hardening solution in the first fifth of the winding zone is maintained between 20° C. and 50° C. Narrow bands of this kind which may be pigmented or dyed are suitable for use in the hat industry and as effect threads in fabrics. As compared with similar bands of cellulose foils they are distinguished by their superior resistance to water and by their retention of shape.

Example 16

Threads obtained according to Example 2, paragraph 1, and stretched in the spinning bath to 360 percent are, for hardening, treated on a perforated cake-support first for 10 minutes at 22° C., then for 15 minutes at a temperature rising from 25° C. to 95° C. and finally for an additional 15 minutes at a temperature maintained at 95° C., with an aqueous solution containing 20 percent of sodium chloride, 3.5 percent of diacetyl, and 1 percent of hydrogen chloride, the solution being circulated by pumping. The threads so obtained shrink considerably when boiled in the form of a loosely wound ball. Subsequently, however, they are fast to boiling.

If the same bath is caused to act under comparable conditions upon threads of polyvinyl alcohol without addition of polyacrylamide, the greater part of the threads dissolves on boiling in water.

Example 17

A solution containing 15 percent of polyvinyl acetate which has been hydrolysed to the extent of 75 percent, and 3 percent of the copolymer of 1 mol of caprolactam, 1 mol of adipic acid, and 1 mol of butane-diol-bis-γ-aminopropyl ether, in aqueous methanol of 35 percent strength, is spun through a nozzle for producing narrow bands into a potassium acetate solution of 30 percent strength, the methanol content of which is permanently maintained below 5 percent by distilling off the methanol in one section of a cyclic process. The narrow band obtained is stretched to 200 percent in an aqueous ammonium sulfate solution of 40 percent strength heated to 80° C., washed with an ammonium acetate solution of 20 percent strength and wound up on a perforated roll. The material wound up in the form of a bobbin is then hardened in a processing apparatus at a temperature rising from 25° C. to 80° C., with a solution containing 20 percent of sodium chloride, 2 percent of hydrogen chloride, and 6 percent of formaldehyde, and dried on the bobbin. Thereupon it is heated for 30 minutes at 125° C. and finally after taking the wound mass off the solid support, caused to shrink in water at 95° C.

Example 18

A solution containing 13 percent of polyvinyl alcohol, 1.5 percent of polyacrylamide and 3.5 percent of the linear basic polyurea obtained from 1 mol each of hexamethylene diisocyanate and N-methyl-di-γ-aminopropylamine, the polyurea being added to the spinning solution predissolved in acetic acid of 10 percent strength, is spun through a nozzle with perforations having a diameter of 0.1 mm. into a precipitating bath heated to 50° C. containing 40 percent of ammonium sulfate and 5 percent of ammonia. The spinning material is drawn, in the form of a bundle of parallel threads, from 20 nozzles with 1000 perforations each, through a precipitating bath 2 metres long at a speed of 25 metres per minute, rinsed with an ammonium acetate solution of 20 percent strength, the liquid removed with suction and the product dried in a warm air current and stretched at 150° C. in the ratio of 100:260. The stretched cable of threads is then laid in coils and formalized in a washing channel with a time of dwell of 10 minutes using a solution containing 20 percent of sodium chloride, 5 percent of formaldehyde, and 1 percent of hydrogen chloride. At the entry of the cable the temperature of the formalization solution is 65° C., at the exit 95° C. After having left the formalization bath, the cable is conveyed over a drum washer, and subsequently the surplus liquid is squeezed out and removed by suction. Thereupon, the cable is dried and is now run without tension, on a conveyor belt, through a channel heated to 135° C. with a time of dwell of 12 minutes. The cable is conducted into a heat insulated chamber for crimping by impact, into which chamber there is forced, through fine openings near the entry of the card sliver, water at 105° C. Here the material is crimped and shrunk at the same time. Thereupon, the cable is cooled with cold water, cut while still damp, dried and opened. The staple fibre obtained in this way has good strength properties and can be dyed with acid levelling dyestuffs to yield deep tints.

Example 19

An aqueous solution containing 15 percent of polyvinyl alcohol (viscosity as indicated in Example 1) and 1.5 percent of polyacrylamide is spun through a nozzle with 60 perforations each of a diameter of 0.08 mm. into an aqueous precipitating bath of 26° C. which contains 44 percent of primary sodium phosphate (coagulation distance: 4 metres). The thread drawn off at a speed of 9.4 metres per minute is stretched outside the bath between two pairs of rollers in air of room temperature in a ratio of 1:3.6. The thread is then washed on the bobbin with soft water of 20° C. and is finally dried for 2 hours at 60° C. Thereupon the thread is twisted by 50 revolutions per metre, afterstretched in a hot air current at 205° C. in a ratio of 1:2, and, in the same working process, caused to shrink at the same temperature by 25 percent. At 205° C. the thread is afterstretched once more by 50 percent. The oriented thread being on a rigid bobbin is, for formalization, introduced into a bath containing 20 percent of sodium chloride, 4.5 percent of formaldehyde, and 1 percent of hydrogen chloride. Within 5 minutes the bath is heated to 95° C. and maintained for another 5 minutes at this temperature. The threads are then washed with water, with a sodium acetate solution of 1 percent strength, and once more with water. Finally they are dried for 30 minutes at 110° C. The threads so obtained have a tensile strength of 3.5 grams per denier and an elongation at break of 25 percent.

Compared with threads prepared in the same way but without addition of polyacrylamide, the threads obtained according to the process of the present invention are distinguished by a higher modulus of elasticity and a correspondingly firmer and fuller handle. In addition, the softening point has increased considerably, namely from 218° C. to 240° C. When shrunken in boiling water without tension, the reduction of the length amounts to only 7 percent. If, after the second hot stretching treatment, the thread is made to shrink once more by 15 percent at 205° C., the reduction of the length on boiling in water amounts to about 2 percent only.

I claim:

1. In the process of preparing threads by extrusion of solutions of high polymers through narrow openings, the steps which comprise extruding into an aqueous precipitation bath an aqueous solution of polyvinyl alcohol and a synthetic linear high polymer containing amido nitrogen and active hydrogen attached to said amido nitrogen, orienting resultant threads and hardening the oriented threads by means of an active carbonyl compound at an elevated temperature in the presence of a compound of acid reaction.

2. In the process of preparing threads by extrusion of solutions of high polymers through narrow openings, the steps which comprise extruding into an aqueous precipitation bath polyvinyl alcohol and a synthetic linear high polymer containing amido nitrogen and active hydrogen attached to said amido nitrogen, said polymers being dissolved in an aqueous medium, orienting resultant threads and hardening the oriented threads by means of a compound of the group consisting of aldehydes and substances yielding aldehydes under the reaction conditions in the presence of a compound of acid reaction and at an elevated temperature.

3. In a process of preparing threads by extrusion of solutions of high polymers through narrow openings, the steps which comprise extruding into an aqueous precipitation bath an aqueous solution of polyvinyl alcohol and a synthetic linear high polymer containing radicals of the group consisting of active hydrogen-containing amide groups and basic amino groups, orienting resultant threads, hardening the oriented threads by means of a compound of the group consisting of aldehydes and substances yielding aldehydes under the reaction conditions in the presence of a compound of acid reaction and at an elevated temperature.

4. In the process of preparing threads by extrusion of solutions of high polymers through narrow openings, the steps which comprise extruding into an aqueous precipitation bath an aqueous solution of polyvinyl alcohol and a synthetic linear high polymer which contains amide nitrogen, active hydrogen attached to said amide nitrogen and salt-forming groups securing solubility in water, orienting resultant threads and hardening the oriented threads by means of a compound of the group consisting of aldehydes and substances yielding aldehydes under the reaction conditions in the presence of a compound of acid reaction and at an elevated temperature.

5. In the process of preparing threads by extrusion of solutions of high polymers through narrow openings, the steps which comprise extruding into an aqueous precipitation bath containing inorganic salts, an aqueous solution containing polyvinyl alcohol and a synthetic linear high polymer containing amide nitrogen and active hydrogen attached to said amide nitrogen, removing the bath from the water soluble threads, drying the threads which are still soluble in water, stretching the dry threads at temperatures between 100 and 225° C. and hardening the oriented threads by means of a compound of the group consisting of aldehydes and substances yielding aldehydes under the reaction conditions in the presence of a compound of acid reaction and at an elevated temperature.

6. In the process of preparing threads by extrusion of solutions of high polymers through narrow openings, the steps which comprise extruding into an aqueous precipitation bath an aqueous solution of polyvinyl alcohol and a synthetic linear high polymer containing amide nitrogen and active hydrogen attached to said amide nitrogen, orienting resultant threads and hardening the oriented threads by means of a compound of the group consisting of aldehydes and substances yielding aldehydes under the reaction conditions at a temperature between 60° C. and 110° C. during which operation the threads are allowed to shrink at least temporarily.

7. In the process of preparing threads by extrusion of solutions of high polymers through narrow openings, the steps which comprise extruding into an aqueous precipitation bath an aqueous solution containing polyvinyl alcohol and a synthetic linear high polymer containing amide nitrogen and active hydrogen attached to said amide nitrogen, orienting resultant threads, acetalizing and thus hardening the oriented threads by the action of a substance of the group consisting of aldehydes and substances yielding aldehydes under the reaction conditions, subjecting the threads during the said acetalization to a shrinking process which is preferably carried out continuously, and stretching them again to a length exceeding the initial length.

8. Highly oriented threads consisting of polyvinyl alcohol and a linear high polymer containing amide nitrogen and active hydrogen attached to said amide nitrogen, said threads being insoluble in formic acid.

9. A process according to claim 1 in which the synthetic linear polymer is substituted by the radical of an $\alpha,\beta$-unsaturated carboxylic acid amide.

10. A process according to claim 1 in which the aldehyde is formaldehyde.

11. Highly oriented threads containing a polymer of water-soluble vinyl polymers which contain hydroxy groups attached to the carbon chain of the macro-molecule and a synthetic essentially linear polymer containing amido nitrogen and active hydrogen attached to said amido nitrogen, said polymers containing acetal groups.

References Cited in the file of this patent

UNITED STATES PATENTS

| | | |
|---|---|---|
| 2,090,669 | Dreyfus et al. | Aug. 24, 1937 |
| 2,155,067 | Ubbelohde | Apr. 18, 1939 |
| 2,169,250 | Izard | Aug. 15, 1939 |
| 2,239,718 | Izard | Apr. 29, 1941 |
| 2,332,897 | D'Alelio | Oct. 26, 1943 |
| 2,454,678 | Smith et al. | Nov. 23, 1948 |

OTHER REFERENCES

British Plastics, Polyvinyl Alcohol, part II, February 1944, pages 77–83.